United States Patent [19]

Ferguson

[11] Patent Number: 5,234,731
[45] Date of Patent: Aug. 10, 1993

[54] THERMOPLASTIC MULTI-LAYER PACKAGING FILM AND BAGS MADE THEREFROM HAVING TWO LAYERS OF VERY LOW DENSITY POLYETHYLENE

[75] Inventor: Daniel J. Ferguson, Spartanburg, S.C.

[73] Assignee: W.R. Grace & Co.-Conn., Duncan, S.C.

[21] Appl. No.: 529,041

[22] Filed: May 25, 1990

[51] Int. Cl.⁵ .................. B32B 27/08; B32B 27/30; B32B 27/32; B29D 7/02
[52] U.S. Cl. .................................... 428/34.9; 428/516; 428/518; 428/35.4; 428/35.2; 428/367; 428/212; 428/519; 428/910; 427/551; 426/127; 264/176.1; 526/348; 526/348.6; 526/352.2
[58] Field of Search ............... 428/34.9, 349, 516, 428/518, 35.4, 35.2, 36.7, 212, 218, 340, 500, 515, 519, 910; 426/127; 380/109, 113, 114, 908; 264/176.1; 526/348, 348.6, 352.2

[56] References Cited

U.S. PATENT DOCUMENTS

| | | | |
|---|---|---|---|
| 3,741,253 | 6/1973 | Brax et al. | 138/137 |
| 4,064,296 | 12/1977 | Bornstein et al. | 428/35 |
| 4,399,173 | 8/1983 | Anthony et al. | 428/35 |
| 4,640,856 | 2/1987 | Ferguson et al. | 428/36 |
| 4,801,486 | 1/1989 | Quacquarella et al. | 428/34 |
| 4,863,769 | 9/1989 | Lustig et al. | 428/34 |
| 4,863,784 | 9/1989 | Lustig et al. | 428/215 |
| 4,927,708 | 5/1990 | Herran et al. | 428/332 |
| 4,976,898 | 12/1990 | Lustig et al. | 264/22 |

FOREIGN PATENT DOCUMENTS 0292894 11/1988 European Pat. Off.

Primary Examiner—Ellis P. Robinson
Assistant Examiner—Charles R. Nold
Attorney, Agent, or Firm—Leigh P. Gregory; William D. Lee, Jr.; Mark B. Quatt

[57] ABSTRACT

A heat-shrinkable, oriented film having two layers of different very low density polyethylenes is disclosed. The melt index of the polyethylenes differs by about 1 or more decigrams/minute. The films have good shrink and good puncture resistance.

15 Claims, No Drawings

THERMOPLASTIC MULTI-LAYER PACKAGING FILM AND BAGS MADE THEREFROM HAVING TWO LAYERS OF VERY LOW DENSITY POLYETHYLENE

The invention relates to thermoplastic, multi-layer, heat-shrinkable (i.e. oriented) packaging films and bags or pouches made therefrom. In particular, this invention relates to films and bags having excellent heat-shrinkability properties, and abuse-resistance properties. Heat-shrinkable thermoplastic films are being used in packaging of non-food and food products like meat, cheese, poultry and the like. Such films with one layer of very low density polyethylene, a material known for toughness, are disclosed in some of the patents discussed below. But it has been unexpectedly discovered that the film can have two layers of very low density polyethylene, yet the film still has excellent shrink, when just the opposite would be expected—the additional layer of tough polymer should have interfered with the shrink and caused poor heat shrink characteristics.

BACKGROUND OF THE INVENTION

A film known from U.S. Pat. No. 3,741,253 to Brax comprises a core layer of a vinylidene chloride copolymer (saran) between a layer of ethylene-vinyl acetate copolymer and layer of a cross-linked ethylene-vinyl copolymer. Ethylene-vinyl acetate copolymer (EVA) has some improved properties over the previously used polyethylene. Vinylidene chloride copolymers are known barrier materials to fluids such as oxygen.

As disclosed in U.S. Pat. No. 4,064,296 to Bornstein, the core layer may also be a hydrolized ethylene-vinyl acetate copolymer (EVOH). It has similar oxygen barrier properties as vinylidene chloride copolymers and offers the advantage that it may be irradiated without discoloration, which is further discussed below.

U.S. Pat. No. 4,640,856 to Ferguson et al, commonly assigned to W. R. Grace, discloses a multi-layer, thermoplastic barrier film having at least threw layers comprising: (a) a layer consisting essentially of very low density polyethylene having a density of less than 0.910 gms/cc; (b) a barrier layer comprising a material selected from the group consisting of: (1) copolymers of vinylidene chloride and (2) hydrolyzed ethylene-vinyl acetate copolymers; (c) a thermoplastic polymeric layer, said layer being on the side of the barrier layer opposite to that of layer (a); and (d) the shrinkage of layer (a) controlling the shrinkage of the entire multi-layer barrier film said multi-layer film having been oriented and rendered heat shrinkable at a temperature below 100° C. (212° F.), said orientation temperature being about 40° F., or more below the melt temperature of said very low density polyethylene.

U.S. Pat. No. 4,801,486, Quacquarella and Williams, assignors to W. R. Grace & Co.-Conn., discloses a multi-layer thermoplastic packaging film having improved heat shrink and cold seal properties, said film comprising:
 (a) a first surface layer which is a heat sealing surface, said layer comprising;
  (1) a copolymer of ethylene and an alpha-olefin having 4 to 8 carbon atoms per molecule; and,
  (2) said copolymer comprising 90% to 75% ethylene and 10% to 25% alpha-olefin having 4 to 8 carbon molecules and a density of less than 915 kg/m$^3$;
 (b) a second surface layer, said layer comprising a polymer selected from the group consisting of amide polymers, ethylene/vinyl-acetate copolymers, the copolymer of the first layer, and ionomers;
 (c) a first core layer comprising an ethylene/vinyl-acetate copolymer;
 (d) a second core or barrier layer comprising a polymer selected from the group consisting of copolymers of vinylidene chloride and hydrolyzed copolymers of ethylene/vinyl-acetate;
 e) said core layers being internal film layers positioned between said first and second surface layers;
 (f) at least one adhesive layer to promote adhesion of the barrier layer to another layer; and
 (g) said film comprising at least five layers.

European Patent Application Publication Number 0292894 published Nov. 30, 1988 to Lustig and Schuetz, assignors to Viskase, discloses a coextruded, heat-shrinkable multi-layer film for packaging fresh red meat cuts and processed meats. The film comprises a first layer comprising very low density polyethylene a first core layer of vinylidene chloride-methyl acrylate copolymer, and a second layer comprising very low density polyethylene. In another embodiment the first layer is a second core layer confined between said first core layer and a first outer layer comprising a heat sealable thermoplastic polymer or copolymer. In a further embodiment the second layer is a second core layer confined between said first core layer and a second outer layer comprising a thermoplastic polymer or copolymer.

OBJECTS AND FEATURES OF THE INVENTION

In the usual distribution chain, a whole primal or subprimal is packaged within shrink bags of this type. The meat within the bag will travel from a central slaughter house where it has been packaged to a retail supermarket where the bag will be opened and the meat will be cut for retail portions. Thus, the bags of this type must satisfy a number of requirements which are imposed by both the slaughter house or packaging house and by the bag user. Furthermore, often the bag is placed in the show case at the retail supermarket for special promotions when a whole loin, for example, is to be sold to the consumer for his use. At this point, it is desirable to have an attractive package whereby there has been relatively complete shrinkage of the bag around the product so that the bag is not wrinkled and the blood and juices are not trapped in the folds of the wrinkles. Accordingly, it is one object of the present invention to provide a film and receptacle made therefrom which has good shrink characteristics.

Another important characteristic of a bag is the capability of the bag to physically survive the process of being filled, evacuated, sealed, closed, heat shrunk, boxed, shipped about the country, unloaded, and stored at the retail supermarket. This type of abuse rules out many polymeric films. Another feature required by bags used for the forgoing described application is that the bag must also be strong enough to survive the handling involved in moving package meat which may weight 100 pounds or more or large chunks of cheese weighing 60 pounds or more. Accordingly, it is another object of the present invention to provide a new combination of polymeric films which will withstand the abuse of packing, shipping and storing.

It is a further object of this invention to provide a packaging film and bags made therefrom which have excellent heat-shrinkability characteristics and also having excellent abuse resistance or strength, as compared to materials used in the past and thereby provide a minimal risk of breakages when bags made of the film material are utilized in automated loading processes.

SUMMARY OF THE INVENTION

Therefore, the present invention provides a thermoplastic, multi-layer, heat-shrinkable packaging film comprising at least two layers of a copolymer of ethylene and an alpha-olefin with 4 or more carbon atoms per molecule, said ethylene/alpha-olefin copolymer having a density of about 0.910 g/cc or less and the ethylene alpha-olefin of one said layer having a melt index of about 1 or more units less than the melt index of the ethylene alpha-olefin of the other said layer.

The invention also provides a thermoplastic, multilayer, heat-shrinkable packaging film having excellent abuse resistance properties comprising an outside polymer layer, a heat sealing layer and an interior layer between said sealing and said outside layers, wherein said interior layer and said outside layer each comprises a copolymer of ethylene and an alpha-olefin with 4 or more carbon atoms per molecule, said ethylene/alpha-olefin copolymer having a density of about 0.910 g/cc or less and the melt index of the ethylene alpha-olefin of the interior layer is about 1 or more units less than the melt index of the ethylene alpha-olefin of the outside layer.

In an especially preferred embodiment, the film is of the 6 layer structure: heat sealing layer/first VLDPE layer/adhesive layer/barrier layer/adhesive layer/second VLDPE layer (abuse).

In another aspect the invention also provides side sealed and/or end sealed bags made from the above-mentioned inventive film.

DETAILED DESCRIPTION OF THE INVENTION

Suitable ethylene/alpha-olefin copolymers, for use in at least two layers of the multilayer, heat-shrinkable films of the invention, belong to the class of polymers known as very low density linear polyethylene (VLDPE). VLDPE is further discussed below. The VLDPE's suitable for use in the films of the invention have a density of about 0.910 g/cc or less, and an alpha-olefin comonomer with 4 or more carbon atoms. Such comonomers include, but are not limited to 4-methyl-pentene-1, hexene-1, and octene-1.

Whereas conventional polyethylenes and linear low density polyethylenes (hereinafter LLDPEs) have densities as low as 0.912, the very low density polyethylenes (hereinafter VLDPE's) currently on the market have densities of 0.910 or below, specifically, 0.900 to 0.906, and it is thought that densities as low as 0.860 will be forthcoming. In "Plastics Technology" magazine for September 1984 at page 113, a news item entitled "Introducing Very Low Density PE" briefly described some of VLDPE's properties and stated that it's what the manufacturer "Calls an entirely new class of polyethylene, consisting of linear copolymers that can be produced at densities down to 0.89 or lower. What makes them special is an unique combination of properties in between those of standard PE's and polyolefinic rubbers". In the October 1984 issue of "Plastics Technology" at page 13, another article appeared entitled "New Kind of Polyethylene Combines Flexibility, Toughness, Heat Resistance". This article lists a number of the properties of VLDPE and compares them with EVA and states that uses for this material is for squeeze tubes, bottles, hoses, tubing, drum liners and film. VLDPE is also listed as having potential as an additive. It is expected to be used as a blending resin in high density polyethylene, polypropylene, EVA, and some EPR's, with all of which VLDPE is compatible. According to the article, the first two commercially available grades are from Union Carbide and are designated "DFDA-1137 NT7" and DFDA-1138. On page 15 in the same article, it stated that "the new resins have been injection molded, extruded, blow molded, and thermoformed on standard equipment". It is noted that blown film can be extruded on systems designed either for conventional LDPE of for LLDPE. However, the company generally recommends LLDPE-type screw designs in high torque capability, especially with narrow-MWD grades. The article observes that the enlarged die gaps required by LLDPE are not required for VLDPE and that conventional blown film die gaps of 30–40 mil have proven satisfactory at blow up ratios of 2–3:1. For blown film DFDA-1137 and 1138 are said to extrude much like 2-MI LLDPE or 0.5-MI LDPE. Some of the commercially available suitable VLDPE's are the XU61512.13 resin and the XU61512.08L resin supplied by Dow, and DEFD resin supplied by Union Carbide.

Typically, in the manufacture of films, a suitable polymer usually in the form of pellets or the like, is brought into a heated area where the polymer feed is melted and heated to its extrusion temperature and extruded as a "tubular "blown bubble" through an annular die. Other methods, such as "slot die" extrusion wherein the resultant extrudate is in planar, as opposed to tubular, form are also well known. If heat-shrinkable film is desired, then after extrusion, the film is typically cooled and stretched, i.e. oriented by "tenter framing" or by inflating with a "trapped bubble", to impart the heat-shrinkable property to the film, as is further described below. If desired, irradiation, typically via an electron beam, may take place after but preferably takes place prior to the stretching for orienting the film. However, for the present invention, such irradiation is not necessary since a very suitable packaging film is obtained without irradiation. Below, first is described in detail the general process for making and orienting film. Then irradiation is described in detail.

More particularly, the manufacture of shrink, i.e. oriented, films may be generally accomplished by extrusion (single layer films) or coextrusion (multi-layer films) of thermoplastic resinous materials which have been heated to or above their flow or melting point from an extrusion of coextrusion die in, for example, either tubular or planar (sheet) form, followed by a post extrusion cooling. The stretching for orienting the film may be conducted at some point during the cool down while the film s still hot and at a temperature within its orientation temperature range, followed by completing the cooling. Alternatively, after the post extrusion cooling, the relatively thick "tape" extrudate is then reheated to a temperature within its orientation temperature range and stretched to orient or align the crystallites and/or molecules of the material, and then cooled again. The orientation temperature range for a given material or materials will vary with the different resinous polymers and/or blends thereof which comprises the material. However, the orientation temperature range for a given thermoplastic material may generally be stated to be below the crystalline melting point of the material but above the second order transition temperature (sometimes referred to as the glass transition point) thereof. Within this temperature range, the material may be effectively stretched to provide a heat-shrinkable film.

The terms "orienting" or "oriented" are used herein to describe generally the process steps and resultant product characteristics obtained by stretching, transversely, longitudinally, or both (whether during the post extrusion cool down or during reheating after the post extrusion cool down as described in the paragraph above) and substantially immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and release stress. Both of these properties may be measured in accordance with ASTM D2838-81. When the stretching force is applied in one direction, monoaxial orienting results. When the stretching force is applied in two directions, biaxial orienting results. The term oriented is also herein used interchangeably with the term "heat-shrinkable" with these terms designating a material which has been stretched and set by cooling while substantially retaining its stretched dimensions. As oriented (i.e. heat-shrinkable) material will tend to return to its original unstretched (unextended) dimensions when heated to an appropriate elevated temperature.

Returning to the basic process for manufacturing film as discussed above, it can be seen that the film, once extruded (or coextruded if it is a multi-layer film), is then oriented by stretching within its orientation temperature range. The stretching to orient may be accomplished in many ways such as, for example, by "trapped bubble" techniques or "tenter framing". These processes are well known to those in the art and refer to orienting procedures whereby the material is stretched in the cross or transverse direction (TD) and/or in the longitudinal or machine direction (MD). After being stretched, the film is quickly cooled while substantially retaining its stretched dimensions to cool the film rapidly and thus set or lock-in the oriented molecular configuration.

When a material is of the heat-shrinkable (i.e. oriented) type, then after wrapping, the enclosed product may be subjected to elevated temperatures, for example, by passing the enclosed product through a hot air tunnel or by placing the enclosed product in hot water. This causes the enclosing heat-shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bags or pouches forming methods, likewise, are well known to those of skill in the art.

Various other polymers also may be employed for the inner heat sealing layer of the preferred multi-layer barrier films of the present invention. Many of these other polymers are also suitable for use in any other layers of the films of the present invention, whether or not the films are barrier films. Suitable other polymers include, but are not limited to, ethylene vinyl acetate (EVA) copolymers, LLDPE, LDPE, HDPE, MDPE, polypropylene, ethylene/propylene copolymers, ethylene/alkyl-acrylate copolymers (EAA) [such as ethylene/methyl-acrylate (EMA), ethylene/ethyl-acrylate (EEA), and ethylene/butyl-acrylate (EBA)], and acid modified EVA.

Sometimes it is desired to irradiate with electrons one or more layers of a film containing a barrier layer comprised of one or more copolymers of vinylidene chloride (i.e. saran), such as of vinylidene chloride and acrylonitrile or such as of vinylidene chloride and vinyl chloride or such as of vinylidene chloride and methyl acrylate. In other words, the barrier layer includes a saran layer in addition to or instead of an EVOH layer. Those of sill in the art generally recognize that irradiation with high energy electron is generally harmful to such saran barrier layer compositions, as irradiation may degrade and discolor saran, making it turn brownish. Thus, if full coextrusion and orientation followed by electron irradiation of the multi-layer structure is carried out on a film having a saran layer, the irradiation should be done at low energy levels with care. Alternatively, this situation may be avoided by using extrusion coating. Accordingly, by means of extrusion coating, one may first extrude or coextrude a first layer or layers, subject that layer or layers to high energy electron irradiation and thereafter extrusion coat the saran barrier layer and, for that matter, simultaneously or sequentially extrusion coat other later layers (which may or may not have been irradiated) onto the outer surface of the extruded previously irradiated tube and then orient the resultant. This sequence allows for the irradiative treatment of the first and layer layer or layers without subjecting the saran barrier layer to the harmful discoloration effects thereof.

In the Examples below the multi-layer films were made by a conventional method of manufacturing, combining tubular coextrusion with extrusion coating to achieve an oriented (heat-shrinkable) film. A tubular process was utilized wherein a coextruded tube of a multi-layer substrate was extrusion coated with saran and other layers simultaneously, then the resultant structure was cooled and collapsed, and then reheated and biaxially stretched in the transverse direction and in the longitudinal machine direction via inflating the tube with a bubble. Then the stretched bubble was cooled and collapsed, and the deflated oriented film wound up as flattened, seamless, tubular film to be used later to make bags, overwrap, etc. Prior to the coating of the saran layer and the additional layers, the substrate was guided through an ionizing radiation field; for example, through the beam of an electron accelerator to receive a radiation dosage in the range of about 4 to 6 megarads (MR).

DEFINITIONS

The term "saran" or "PVDC", as used herein, refers to a vinylidene chloride copolymer wherein a major amount of the copolymer comprises vinylidene chloride and a minor amount of the copolymer comprises one or more unsaturated monomers, copolymerizable therewith. Examples of unsaturated monomers copolymerizable with the vinylidene chloride are vinyl chloride, acrylonitrile, and alkyl acrylates having 1 to 18 carbon atoms in the alkyl group.

As used herein the term "extrusion" or the term "extruding" is intended to include coextrusion, extrusion coating, or combinations thereof, whether by tubular methods, planar methods, or combinations thereof.

An "oriented" or "heat-shrinkable" material is defined herein as a material which, when heated to an appropriate temperature above room temperature (for example 96° C.), will have a free shrink of about 5% or greater in at least one linear direction.

The term "linear low density polyethylene" (LLDPE) as used herein, refers to the newer copolymers of a major amount of ethylene with a minor amount of one or more comonomers selected from $C_3$ to about $C_{10}$ or higher alpha-olefins such as butene-1, pentene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range from about 0.911 g/cc to about 0.935 g/cc, more preferably in the range of from about 0.912 g/cc to about 0.928 g/cc for film making purposes. The melt flow index (MI) of linear low density polyethylene generally ranges from between about 0.1 to 10 grams per ten minutes and preferably between from about 0.5 to about 3.0 grams per ten minutes. LLDPE resins of this type are commercially available and are manufactured in low pressure vapor phase and liquid phase processes using transition metal catalysts. The very low density linear low density polyethylenes (VLDPE) have a density from about 0.910 g/cc to about 0.860 g/cc, or even lower.

The term "ethylene vinyl acetate copolymer" (EVA) as used herein refers to a copolymer formed from ethylene and vinyl acetate monomers wherein the ethylene derived units in the copolymer are present in major amounts and the vinyl acetate (VA) derived units in the copolymer are present in minor amounts. For film forming purposes, it is desirable that the VA content of the EVA be from about 3% to about 25%.

The term "ethylene/alkyl-acrylate copolymer" (EAA) as used herein refers to a copolymer formed from ethylene and alkyl acrylate wherein the alkyl moiety has 1 to 8 carbon atoms and the ethylene derived units in the copolymer are present in major amounts and the alkyl-acrylate derived units in the copolymer are present in minor amounts. Thus, the term "ethylene/methyl acrylate copolymer" (EMA) as used herein for a type of polyethylene, refers to a copolymer formed from ethylene and methyl acrylate monomers. The term "ethylene/ethyl acrylate copolymer" (EEA) as used herein for a type of polyethylene, refers to a copolymer formed from ethylene and ethyl acrylate monomers. The term "ethylene/butyl acrylate copolymer" (EBA) as used herein for a type of polyethylene, refers to a copolymer formed from ethylene and butyl acrylate monomers. Many suitable EBA's are commercially available and these have a butyl acrylate content from about 3% up to about 18% by weight. USI is a commercial supplier of Resin No. 4895, which is an EBA having about 3% by weight butyl acrylate and a melt index of 3 and a melting point of about 106° to 107° C.

Test methods. In the Examples below, free shrink was measured in accordance with ASTM D2732 and puncture in accordance with ASTM D3763. Melt index (abbreivated MI) was measured in accordance with ASTM D1238, condition 190/2.16 and is designated in decigrams/minute.

MATERIALS EMPLOYED IN THE EXAMPLES

A suitable adhesive type of polymer employed in the films of the invention is commercially available as EA 719.009. It is ethylene-based adhesive with a butyl acrylate comonomer functionality. Quantum/USI was thee supplier. This is noted as ADH, short for adhesive.

The LLDPE employed in the examples was Dowlex 2045.03 having a melt index of 1.1 and a density of 0.920. It was supplied by Dow Chemical. The comonomer is octene.

The following VLDPEs were used:

| VLDPE | TRADENAME | MI | DENSITY | COMONOMER | SUPPLIER |
| --- | --- | --- | --- | --- | --- |
| 1 | XU61512.08L | 0.8 | 0.905 | octene | Dow |
| 2 | DEFD 1740 | 0.5 | 0.905 | hexene | Union Carbide |
| 3 | DEFD 1741 | 0.5 | 0.905 | hexene | Union Carbide |
| 4 | DEFD 1742 | 0.25 | 0.905 | hexene | Union Carbide |
| 5 | DEFD 1743 | 3.0 | 0.910 | hexene | Union Carbide |
| 6 | XU61512.13 | 4.0 | 0.905 | octene | Dow |

The saran employed in some of the laboratory examples was Ixan TM WV320 supplied by Solvay Corporation. It is a copolymer of vinylidene chloride with vinyl chloride. This is noted as VDC-VC1.

Another saran (denoted in the examples below as Saran-MA) employed in some of the laboratory examples was XU32027.01, supplied by Dow Chemical. It is a copolymer of vinylidene chloride with methyl acrylate. This is noted as VDC-MA.

Some of the EVA employed in the laboratory examples was NA295-00 which is an EVA containing 6% acetate and having a melt index of 2.6. It was supplied by USI.

The following Examples are intended to illustrate the preferred embodiments of the invention and comparisons thereto. It is not intended to limit the invention thereby.

Percentages indicated in the Examples were calculated as % by weight.

The films were made by first hot blowing through an annular die a three-layer extruded tube of the structure: Layer 1/Layer 2/Layer 3 as the substrate. Then with a three-ply die, a layer of saran (barrier layer 4), adhesion layer 5, and abuse layer 6 were extrusion coated on. The resultant 6-layer structure was then cooled and collapsed. The tube was then reheated and oriented by stretching via a trapped bubble 4:1 in the transverse direction and 3:1 in the longitudinal direction for an overall biaxial orientation of 12:1. When such films were made into bags, the heat sealing layer 1 was the "inner" or "inside" layer as it was the bag "inside", and abuse layer 6 was the bag "outside". The three-layer substrate was irradiated at 4.5 MR prior to the coating on of saran and the outer layers. Various properties, i.e. puncture (abuse) resistance, and % shrink, were measured for the films as noted in the Tables below.

The following 10 films were made, and were about 2.4 to 2.9 mils in thickness after biaxial stretch orientation.

| FILM | LAYER | | | | | |
|---|---|---|---|---|---|---|
| | 1 | 2 | 3 | 4 | 5 | 6 |
| 1 | EVA 90% LLDPE 10% | VLDPE(1) | ADH | VDC-MA | ADH | VLDPE(6) |
| 2** | EVA 90% LLDPE 10% | VLDPE(1) | ADH | VDC-MA | ADH | VLDPE(6) |
| 3* | EVA 90% LLDPE 10% | VLDPE(1) | ADH | VDC-MA | ADH | VLDPE(6) |
| 4 | LLDPE | VLDPE(1) | ADH | VDC-MA | ADH | VLDPE(6) |
| 5 | EVA 90% LLDPE 10% | VLDPE(1) | ADH | VDC-MA | ADH | VLDPE(6) |
| 6** | EVA 90% LLDPE 10% | VLDPE(1) | ADH | VDC-MA | ADH | VLDPE(6) |
| 7 | EVA 90% LLDPE 10% | VLDPE(2) | ADH | VDC-VCl | ADH | VLDPE(6) |
| 8 | EVA 90% LLDPE 10% | VLDPE(3) | ADH | VDC-MA | ADH | VLDPE(6) |
| 9 | EVA 90% LLDPE 10% | VLDPE(4) | ADH | VDC-MA | ADH | VLDPE(6) |
| 10 | EVA 90% LLDPE 10% | VLDPE(5) | ADH | VDC-MA | ADH | VLDPE(6) |
| Average Layer Thickness Before Biaxial Stretch Orientation (mils) | 2.5 | 14 | 1 | 2.2 | 4.5 to 5.5 | 1 |

The 10 films were then tested for the following properties:

| | % Shrink-8 sec. at 185° F. (85° C.) | | Puncture Resistance Mean average of 4 tests | | | Difference between MI of layer 6 and MI of layer 2 in decigrams/min |
|---|---|---|---|---|---|---|
| Film | Transverse | Longitudinal | Peak Load (Pounds) | Gradient (lbs/inch) | Energy to Break (Foot-Pounds) | |
| 1 | 36 | 23 | 49.3 | 40.4 | 2.51 | 3.2 |
| 2** | 47 | 37 | 63.8 | 45.9 | 3.41 | 3.2 |
| 3* | 36 | 22 | 39.4 | 37.2 | 1.98 | 3.2 |
| 4 | 33 | 23 | 50.5 | 42.5 | 2.43 | 3.2 |
| 5 | 39 | 25 | 50.2 | 36.4 | 3.09 | 3.2 |
| 6** | 48 | 36 | 63.4 | 45.5 | 3.82 | 3.2 |
| 7 | 42 | 35 | 49.2 | 45.6 | 2.39 | 3.5 |
| 8 | 42 | 34 | 48.0 | 44.9 | 2.05 | 3.5 |
| 9 | 39 | 29 | 45.5 | 42.6 | 1.86 | 3.75 |
| 10 | 32 | 22 | 31.9 | 40.1 | 1.32 | 1.0 |

*No irradiation of substrate.
**Oriented at a cooler temperature of <200° F. (93° C.), whereas others were oriented at >210° F. (99° C.).

As can be seen, all films showed good abuse resistance. Also, even though the films contained a two layers of VLDPE (as mentioned above, VLDPE is known for toughness which should adversely interfere with shrink because the ability to orient is reduced) all films showed good shrink.

While certain representative embodiments and details have been shown for the purpose of illustration, numerous modifications to the formulations described above can be made without departing from the invention disclosed.

What is claimed is:

1. A thermoplastic, multilayer, heat-shrinkable packaging film comprising a first and a second layer of a VLDPE copolymer of ethylene and an alpha-olefin with 4 or more carbon atoms per molecule, said ethylene/alpha-olefin copolymer having a density of about 0.910 g/cc or less, wherein the melt-index of the ethylene/alpha-olefin of the first layer is about 1 or more decigrams/minute less than the melt index of the ethylene/alpha-olefin of the second layer.

2. The film of claim 1 further including a barrier layer.

3. The film of claim 1 wherein said at least one layer of copolymer of ethylene/alpha-olefin is an interior layer.

4. The film of claim 1 wherein said at least one layer of ethylene/alpha-olefin copolymer has been inrradiated at a dosage up to about 20 MR.

5. The film of claim 1 wherein said first layer of copolymer of ethylene/alpha-olefin is an interior layer and said second layer of copolymer of ethylene/alpha-olefin is a surface layer.

6. A thermoplastic, multilayer, heat-shrinkable packaging film having excellent abuse resistance, and heat shrink properties comprising an outside polymer layer, a heat sealing layer and an interior layer between said sealing and said outside layers, wherein each of said interior and outside layers comprises a VLDPE copolymer of ethylene and an alpha-olefin with 4 or more carbon atoms per molecule, said ethylene/alpha-olefin copolymer having a density of about 0.910 g/cc or less, wherein the melt index of the ethylene/alpha-olefin of the interior layer is about 1 or more decigrams/minute less than the melt index of the ethylene/alpha-olefin of the outside layer.

7. The film of claim 6 wherein said film comprises 6 layers.

8. The film of claim 6 further including a barrier layer between said sealing layer and said outside layer.

9. The film of claim 6 wherein said interior layer has been irradiated at a dosage up to about 20 MR.

10. A multi-layer thermoplastic packaging film having good heat shrink and puncture properties, said film comprising:
   (a) a first surface layer which is a heat sealing surface, said layer comprising an ethylene/vinylacetate copolymer; a linear low density polyethylene copolymer, or a mixture thereof;
   (b) a first core layer comprising
      (1) a VLDPE copolymer of ethylene and alpha-olefin having 4 to 8 carbon atoms per molecule, and
      (2) said copolymer comprising 90% to 75% ethylene and 10% to 25% alpha-olefin having 4 to 8 carbon molecules and a density of about 910 kg/m$^3$ or less, and a melt index of about 3.0 or less;
   (c) a second surface layer comprising
      (1) a VLDPE copolymer of ethylene and an alpha-olefin having 4 to 8 carbon atoms per molecule, and,
      (2) said copolymer comprising 90% to 75% ethylene and 10% to 25% alpha-olefin having 4 to 8 carbon molecules and a density of about 910 kg/m$^3$ or less, and a melt index of about 4.0 or more;
   (d) a second core layer comprising a barrier polymer selected from the group consisting of copolymers of vinylidene chloride and hydrolyzed copolymers of ethylene/vinyl-acetate;
   (e) said core layers being internal film layers positioned between said first and second surface layers;
   (f) at least one adhesive layer to promote adhesion of the barrier layer to another layer; and
   (g) said film comprising at least six layers.

11. A process for manufacturing thermoplastic, multi-layer, heat-shrinkable packaging film having two layers of very low density polyethylene, said process comprising (I) extruding two distinct layers of a VLDPE copolymer of ethylene and an alpha-olefin with 4 or more carbon atoms per molecule, said ethylene/alpha-olefin copolymer having a density of about 0.910 g/cc or less and said copolymers of each of the two layers having a melt index difference of about 1 or more decigrams/minute, (II) orienting the extruded polymers in at least one direction, and (III) recovering a heat-shrinkable polymeric film.

12. The process of claim 11 further including extruding a barrier layer prior to the orienting step.

13. A bag formed from the film of claim 1, said bag having end seal(s), side seal(s), or a combination thereof.

14. The bag of claim 13 further including a barrier layer.

15. The bag of claim 13, wherein at least one layer of copolymer of ethylene/alpha-olefin is an interior layer.

* * * * *

UNITED STATES PATENT AND TRADEMARK OFFICE
CERTIFICATE OF CORRECTION

PATENT NO. : 5,234,731
DATED : August 10, 1993
INVENTOR(S) : Daniel J. Ferguson

It is certified that error appears in the above-indentified patent and that said Letters Patent is hereby corrected as shown below:

Column 10, claim 3, line 35, change "at least one" to --first--.

Column 10, claim 4, line 57, change "at least one" to --first--.

Signed and Sealed this

Twenty-sixth Day of April, 1994

Attest:

BRUCE LEHMAN

Attesting Officer        Commissioner of Patents and Trademarks